(No Model.)

G. S. SHEFFIELD.

Car Wheel.

No. 239,301. Patented March 22, 1881.

WITNESSES

Geo D. Seymour

A. H. Bright.

INVENTOR

Geo. S. Sheffield.

By W. W. Leggett.

ATTORNEY

N. PETERS, PHOTO-LITHOGRAPHER, WASHINGTON, D. C.

UNITED STATES PATENT OFFICE.

GEORGE S. SHEFFIELD, OF THREE RIVERS, MICHIGAN, ASSIGNOR TO GEORGE S. SHEFFIELD & CO., OF SAME PLACE.

CAR-WHEEL.

SPECIFICATION forming part of Letters Patent No. 239,301, dated March 22, 1881.

Application filed June 1, 1880. (No model.)

*To all whom it may concern:*

Be it known that I, GEORGE S. SHEFFIELD, of Three Rivers, State of Michigan, have invented a new and useful Improvement in Car-Wheels; and I do hereby declare the following to be a full, clear, and exact description of the invention, such as will enable others skilled in the art to which it pertains to make and use it, reference being had to the accompanying drawings, which form a part of this specification.

My invention consists in the peculiar features of construction specified, and more particularly pointed out in the claim.

Figure 1:
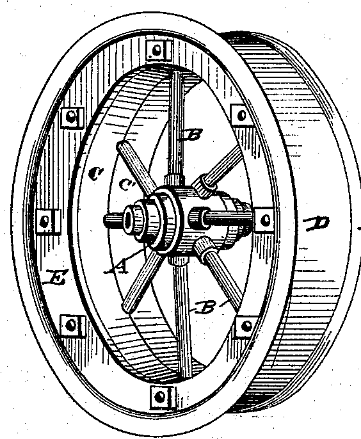
Figure 2:
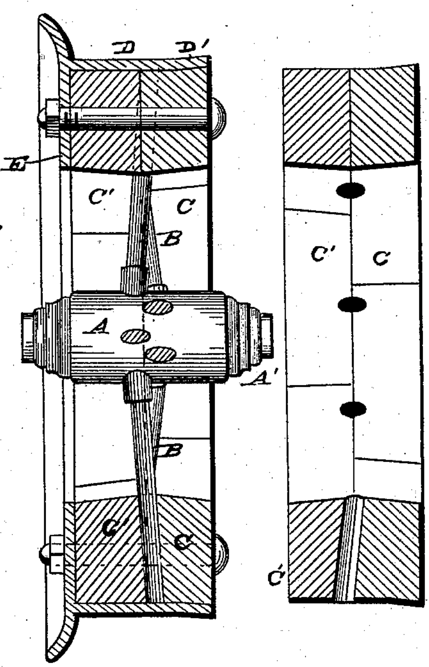
Figure 3:
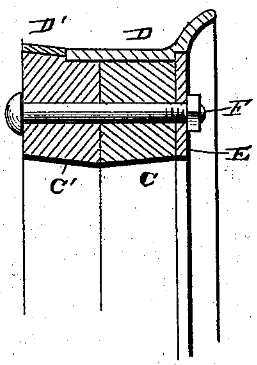
Figure 4:
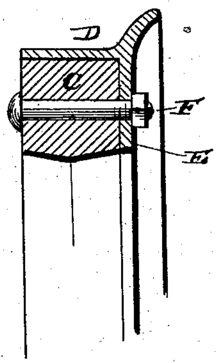

In the drawings, Figure 1 is a perspective view of a wheel embodying my invention. Fig. 2 is a sectional view of the same, illustrating the construction at the rim and hub. Fig. 3 is a variation, in which the flange next to the felly is made separate from the tire; Fig. 4, another variation, in which the tire is made straight across the tread.

This wheel is designed more particularly for hand-cars and railway velocipede-cars, but is equally well adapted for all purposes where a light, elastic, and cheap railway-wheel is desired.

A is the hub or nave; A′, its box; B, the spokes; C, the felly; D, the tire; E, a depending flange extending toward the nave adjacent to the fellies; and F are bolts or screws passing laterally through the fellies and flange E, whereby the tire is firmly bound to the fellies, the fellies are greatly strengthened and supported, and in case of the double fellies the parts are firmly held together upon the intermediate spokes.

The tire may be made with a tread extending straight across and in a single piece with the depending flange E, as shown in Fig. 4, and the fellies may be made single, in the usual manner, with dowel-holes for the dowel ends of the spokes; or the flange E may be made separate from the tire, one form of such separate construction being shown in Fig. 3, in which event the felly and tire should preferably be so conformed that when the bolts or screws F are in place the parts are securely fastened together, as shown. So also, and especially when the wheel is designed for a railway hand-car or velocipede or other light vehicle, I prefer to form the tread with a slight outstanding annular bulge, D′, which materially assists in holding the wheel upon and causing it to hug the track. This bulge D′ may, if desired, be cast or formed solid with the tire D, as shown in Fig. 1, or, inasmuch as it does not have to sustain much wear, it may be made separate therefrom, as shown in Fig. 3.

I prefer generally to make the fellies double—that is, with sections C placed beside and breaking joints with other sections, C′. In this way a stronger felly can be made, and the parts C and C′ can be brought together upon the intermediate spokes, thus clamping them firmly without the necessity of driving the fellies upon them—an operation which would make it difficult afterward to properly set the tire upon them. The spokes should extend through against the tire at their outer ends, and if there is a through-boxing, A′, they may rest against the latter at their hub ends.

We have used these wheels to a very considerable extent, and find them to be strong, light, durable, elastic, and inexpensive. Moreover, should a spoke, a hub, or a section of the felly become broken, the wheel can be readily taken to pieces and the repair effected without the loss of any uninjured element.

I am aware that car-wheels have been constructed with treads having flanges (one or two) extending toward the nave; also, that the treads have been curved to bite upon the tread of the rail; also, that fellies of car-wheels have been made of wooden sections, and hence I make no claim to such features of construction in a car-wheel.

What I claim is—

A car-wheel consisting of a hub, A, wooden spokes B, wooden felly C, tread D, provided with a flange on one edge, and a slightly-raised portion, D′, on its opposite edge, the central portion of the tread being straight, a flange, E, and fastening-bolts F, substantially as set forth.

In testimony whereof I sign this specification in the presence of two witnesses.

GEORGE S. SHEFFIELD.

Witnesses:

JOSEPH M. KIRBY,
WARREN J. WILLETS.